United States Patent [19]
Mead

[11] Patent Number: 5,548,932
[45] Date of Patent: Aug. 27, 1996

[54] ADJUSTABLE CABLE TRAY SUPPORT SYSTEM

[75] Inventor: Bruce E. Mead, Auburn Hills, Mich.

[73] Assignee: Maxcess Technologies, Inc., Pontiac, Mich.

[21] Appl. No.: 335,637

[22] Filed: Nov. 8, 1994

[51] Int. Cl.$^6$ ............................................. E04B 2/82
[52] U.S. Cl. .................. 52/126.6; 52/220.3; 52/220.6; 248/243; 248/49; 403/353
[58] Field of Search ................ 52/126.6, 220.6, 52/220.3; 174/48, 49; 248/49, 68.1, 243, 125, 241; 211/191, 192, 193; 403/353, 354

[56] References Cited

U.S. PATENT DOCUMENTS

| | | | |
|---|---|---|---|
| 3,278,149 | 10/1966 | Brucker | 248/241 X |
| 3,794,183 | 2/1974 | Colbridge | 248/243 X |
| 3,915,420 | 10/1975 | Norris . | |
| 3,938,767 | 2/1976 | Norris . | |
| 4,068,599 | 1/1978 | Sapp et al. | 403/353 X |
| 4,142,341 | 3/1979 | Mott . | |
| 4,142,638 | 3/1979 | Vargo | 248/243 X |
| 4,596,095 | 6/1986 | Chalfant . | |
| 4,630,417 | 12/1986 | Collier | 52/220.3 X |
| 4,676,036 | 6/1987 | Bessert | 52/220.3 X |
| 4,850,162 | 7/1989 | Albrecht | 52/220.3 X |
| 5,049,700 | 9/1991 | Kobayashi et al. | 174/48 |
| 5,100,086 | 3/1992 | Rinderer . | |
| 5,284,311 | 2/1994 | Baer | 211/191 X |
| 5,344,258 | 9/1994 | Papadopoulas | 403/353 X |

FOREIGN PATENT DOCUMENTS 0528925  10/1954  Germany ............................ 211/191 X

*Primary Examiner*—Carl D. Friedman
*Assistant Examiner*—Winnie Yip
*Attorney, Agent, or Firm*—Harness, Dickey & Pierce

[57] ABSTRACT

A support system for a cable tray has a plurality of support rods supported between adjacent pedestals. Each pedestal can provide support for a respective support rod at various locations along the length of the pedestal thus providing for the adjustability of the cable trays. The various locations for supporting the support rods along the length of the pedestal can also be used to provide the support for multiple cable trays.

10 Claims, 4 Drawing Sheets

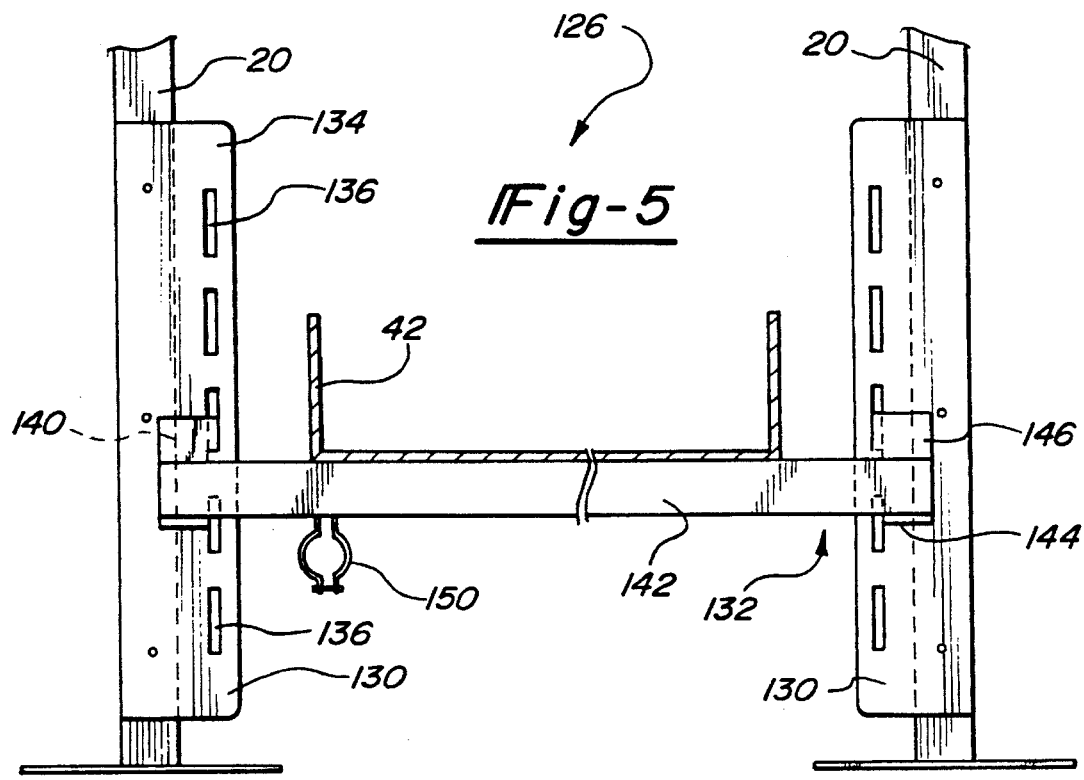
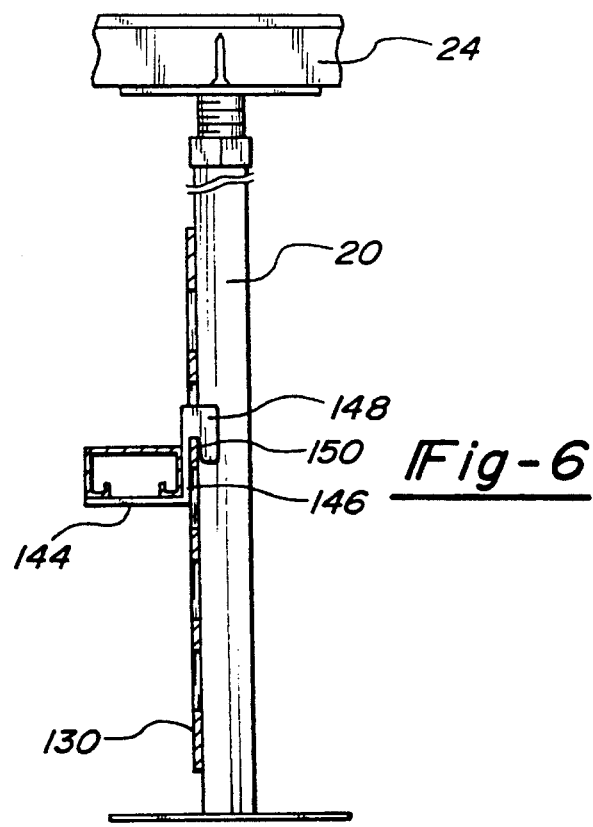

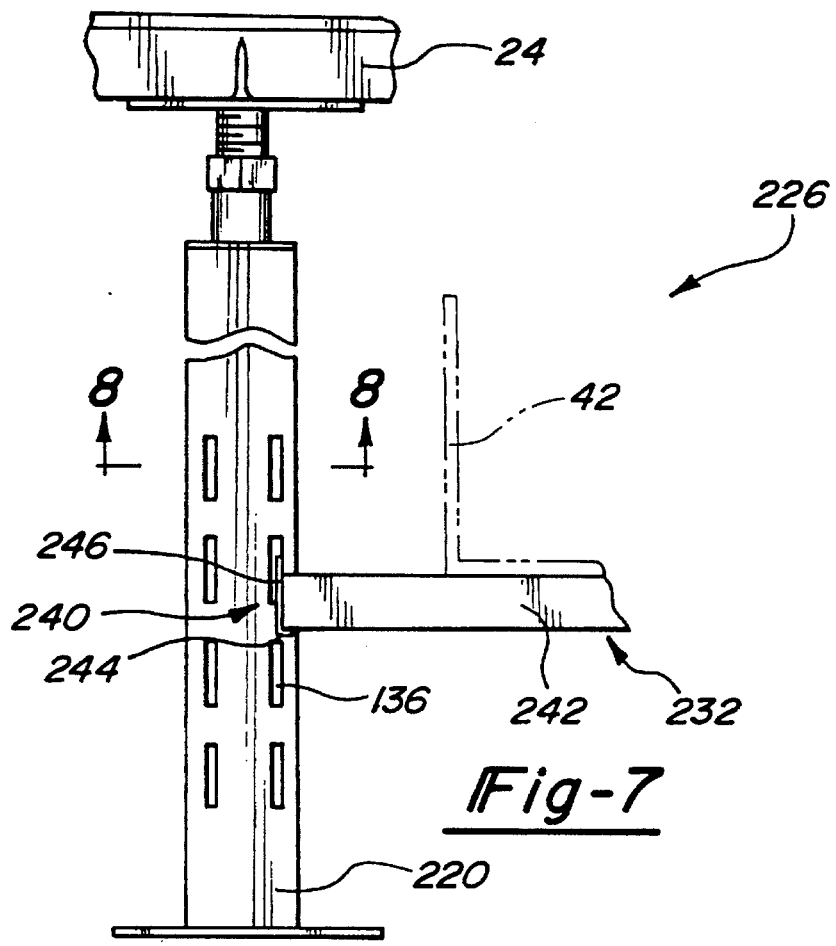
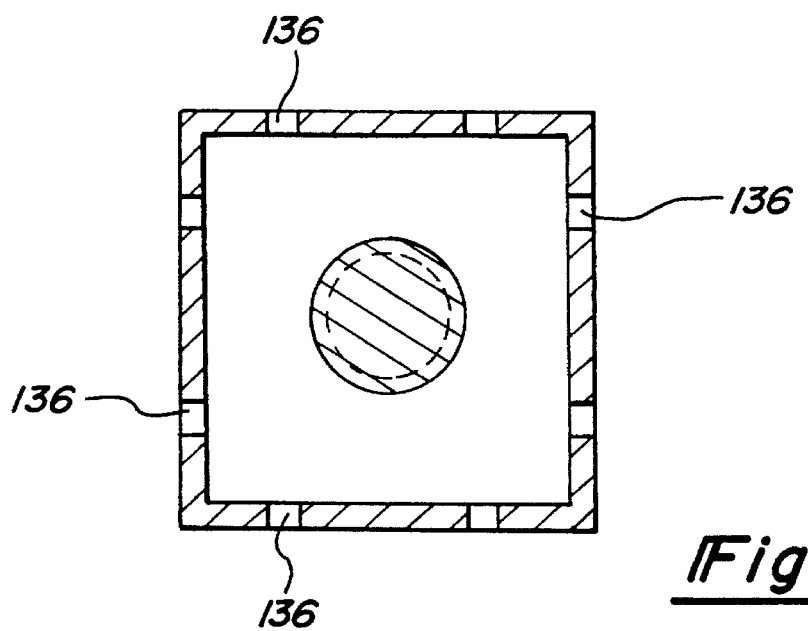

ADJUSTABLE CABLE TRAY SUPPORT SYSTEM

FIELD OF THE INVENTION

The present invention relates to a cable tray support system. More particularly, the present invention relates to an adjustable system for supporting cable trays which allows the user to select the height at which the cable tray is supported and also allows the tiering of multiple cable trays.

BACKGROUND OF THE INVENTION

Cable trays in general have been used in power stations and large industrial plants for a number of years to support and route various cables through the plants rather than placing these cables inside a conduit. These cable trays are normally supported from a wall or a ceiling at levels which are above a person's head in order to avoid obstructing normal floor space. An alternative to the elevated cable tray has been elevated distribution ducts which are also normally mounted from a wall or a ceiling at elevations so as not to interfere with a person standing on the floor and thus again conserve floor space.

In many multi-floor buildings, a current practice is to utilize poured concrete floors. Electrical conductor distribution ducts are normally provided within the poured concrete of these floors in order to provide electrical power distribution to various locations within the building. These electrical power distribution ducts are permanently located within the poured concrete making it impossible to accommodate the rearrangement of equipment as both the use of the floor space changes as well as to accommodate the changes in the equipment due to changes in technology. This has lead to the development of raised floors for certain uses of floor space.

Computer rooms, data processing rooms and electronic equipment rooms, in general, are examples of room uses wherein the overhead wiring distribution approach and/or the power distribution ducts have been partially or totally replaced by the distribution of wires and cables on top of the concrete subfloor and below a removable—panel raised floor on which the electrical equipment is placed. These raised floors are normally supported on pedestal assemblies and the area below the raised floor is designed to be utilized as access for the distribution of the various electrical cables.

With the increased complexity of electronic equipment and the increasing number of pieces of equipment being placed in a single room due to the equipment continuously becoming smaller, the interconnection of these pieces of electronic equipment by communication cables and power cables has become more complex. The space between the subfloor and the raised panel floor is somewhat restricted and there may be times when there is moisture on the concrete subfloor such as due to condensation. Cables lying on the concrete subfloor have to remain unaffected by the moisture on the subfloor and these cables also need to avoid the problems associated with entanglement. Cables simply lying on a concrete subfloor can become so entangled that it is extremely difficult to remove one particular cable from the mass of cables on the subfloor should the individual cable need to be changed or rerouted for any reason.

Prior art cable trays have been developed to eliminate some of the problems associated with the routing of cables beneath the raised panel floor. Typical prior art cable trays are suspended from the structure which supports the removable panels of the raised panel floor. These prior art cable trays are normally suspended between the raised panel floor and the concrete subfloor and provide an organized route for the various cables to travel in order to interconnect the numerous pieces of electronic equipment placed on the raised panel floor.

While the introduction of these prior art cable trays has significantly reduced the entanglement and moisture problems associated with the concrete subfloors, they are not without their problems. As the number of pieces of electronic equipment being placed in a single room increases so does the number of electrical cables. Consequently the number of electrical cables which are being placed within the prior art cable trays is also increasing. This increasing number of cables in the prior art cable trays can now lead to an entanglement problem within the tray. In addition, when it is desired to have specific cables kept separate from each other, the prior art cable trays are used to route one, or one set of cables, while the second or other set of cables, which need to be kept separate, are routed across the concrete subfloor encountering the problems explained above.

Accordingly there is a need for a cable tray support system which can accommodate the larger number of cables being routed beneath the raised panel floor as well as providing for the separate routing of specific cables without relying on the subfloor beneath the raised panel floor for routing of cables.

SUMMARY OF THE INVENTION

The present invention provides the art with a cable tray support system which is adjustable in height between the subfloor and the raised panel floor. The adjustability of the cable trays allows for the accommodation of various sizes of cable trays in order to accommodate varying numbers of conductors. In addition, the cable tray support system of the present invention may also be used for the supporting of multiple cable trays at different heights in order to provide an increased amount of flexibility for the routing of the electrical cables.

Other advantages and objects of the present invention will become apparent to those skilled in the art from the subsequent detailed description, appended claims and drawings.

DETAILED DESCRIPTION OF THE DRAWINGS

In the drawings which illustrate the best mode presently contemplated for carrying out the present invention:

FIG. 5 is an end sectional view of the raised floor assembly similar to FIG. 2 but showing another embodiment of the present invention;

FIG. 6 is a side sectional view of the raised floor assembly illustrated in FIG. 5;

FIG. 7 is a partial end sectional view of the raised floor assembly similar to FIG. 5 but showing another embodiment of the present invention; and FIG. 8 is a sectional view taken in the direction of arrows 8—8 shown in FIG. 7.

DETAILED DESCRIPTION OF THE PREFERRED EMBODIMENT

Figure 1:
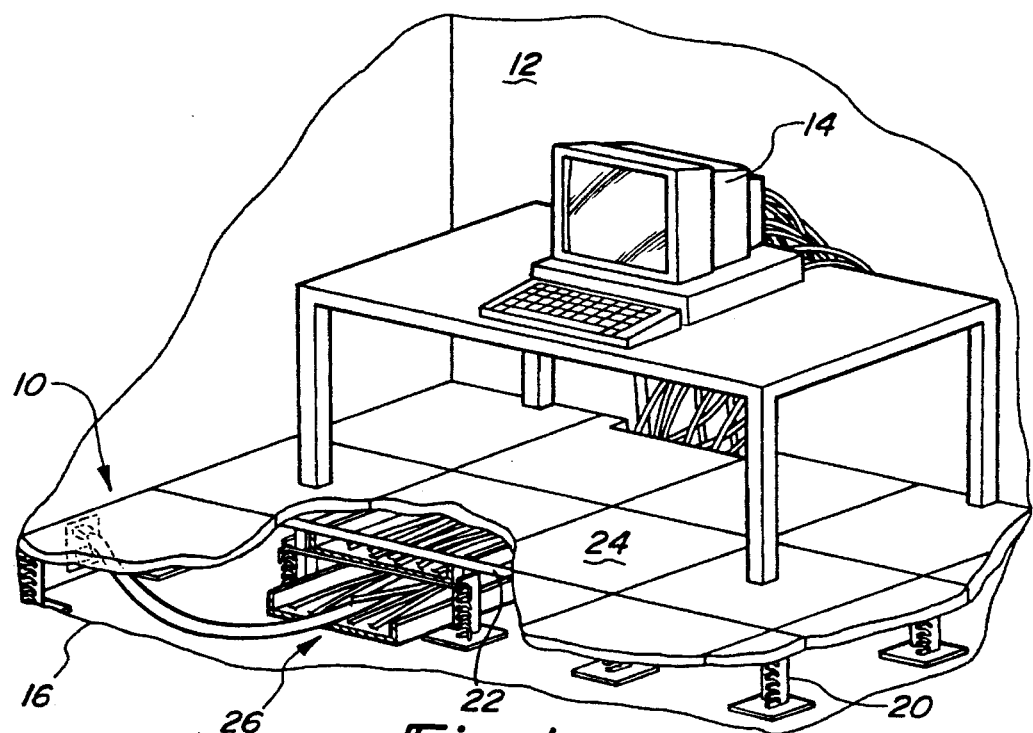
FIG. 1 is a perspective view of a raised floor assembly incorporating the adjustable cable tray support system of the present invention.
Figure 2:
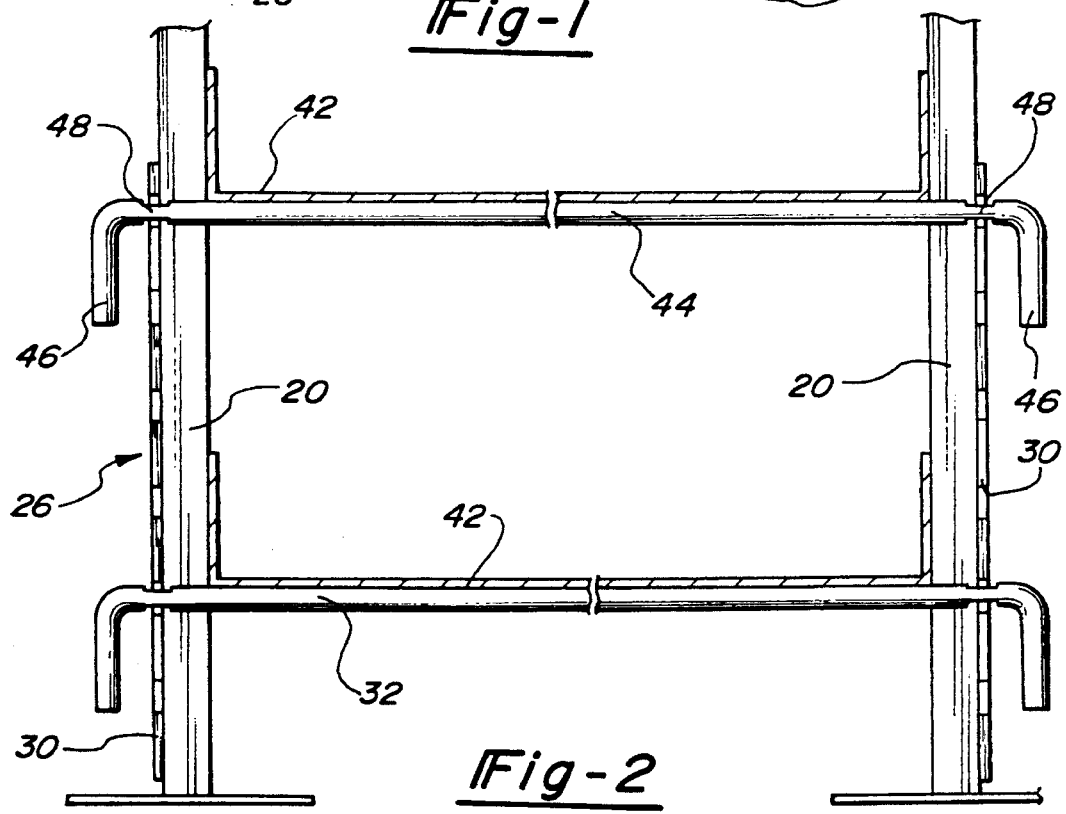
FIG. 2 is an end sectional view of the raised floor assembly in FIG. 1 showing the adjustable cable tray support system of the present invention.
Figure 3:
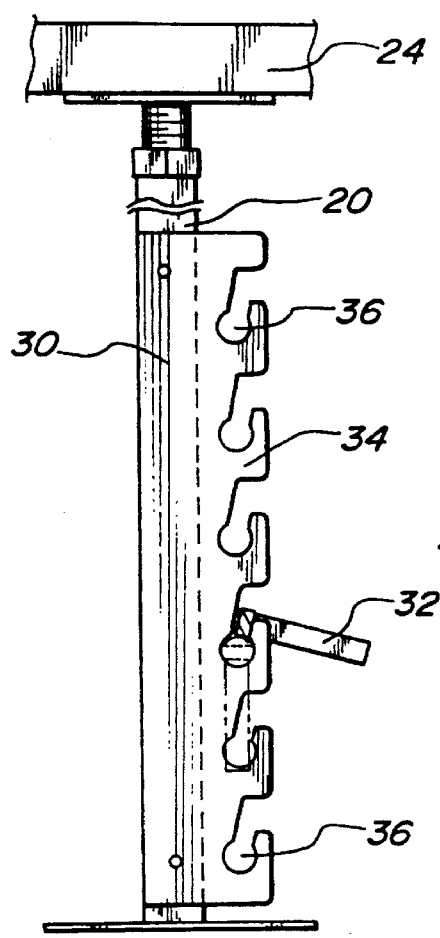
FIG. 3 is side sectional view of the raised floor assembly in FIG. 1 showing the adjustable cable tray support system of the present invention.

Referring now to the drawings in which like reference numerals designate like or corresponding parts throughout the several views, there is shown in FIGS. 1 through 3 a raised floor assembly incorporating the adjustable cable tray support system of the present invention which is designated generally by the reference number 10. Raised floor assembly 10 is especially adaptable to be used in an electronic equipment room 12, such as a room containing computer or data processing equipment 14. The room 12 has a permanent floor or subfloor 16 which may be the usual concrete floor of a typical building. Raised floor assembly 10 is supported above subfloor 16 at a height which is typically about 12 inches although this height can be varied. Raised floor assembly 10 comprises a plurality of vertical pedestals 20, a plurality of crossmembers 22, a plurality of floor panels 24 and an adjustable cable tray support system 26. Vertical pedestals 20 support the raised floor surface comprised of crossmembers 22 and floor panels 24. Pedestals 20 are supported on and are usually secured to subfloor 16 in a regular grid pattern. Typically this grid pattern is 24 inches on center to correspond with the size of floor panels 24, but other grid patterns can be used if desired. Crossmembers 22 are supported by pedestals 20 and define the grid pattern which will receive floor panels 24. In some designs, crossmembers 22 can be eliminated or incorporated into panels 24, in which case, panel 24 will be securely attached to each pedestal 20 to complete the raised floor surface.

Adjustable cable tray support system 26 comprises, as shown in FIGS. 2 and 3, a support plate 30 which is secured to each pedestal 20 and a support rod 32 of sufficient length to span the distance between two support plates 30 secured to adjacent pedestals 20. Each support plate 30 is secured to a respective pedestal 20 by spot welding or other methods known in the art. The width of each support plate 30 is such that a side portion 34 of plate 30 extends beyond the structure of pedestal 20 to provide support for support rods 32 as will be described later herein. Each support plate 30 defines a plurality of slots 36 which angularly extend into side portion 34 of plate 30 to allow multi-positioning for one or more support rods 32. Each slot 36 is comprised of a generally rectangular slit 38 which angularly extends into side portion 34 of plate 30 and opens into a generally circular aperture 40. Circular aperture 40 is slightly larger than the diameter of support rod 32 such that support rod 32 can become nested within aperture 40 such that a cable tray 42 can be supported by the plurality of support rods 32.

Figure 4:
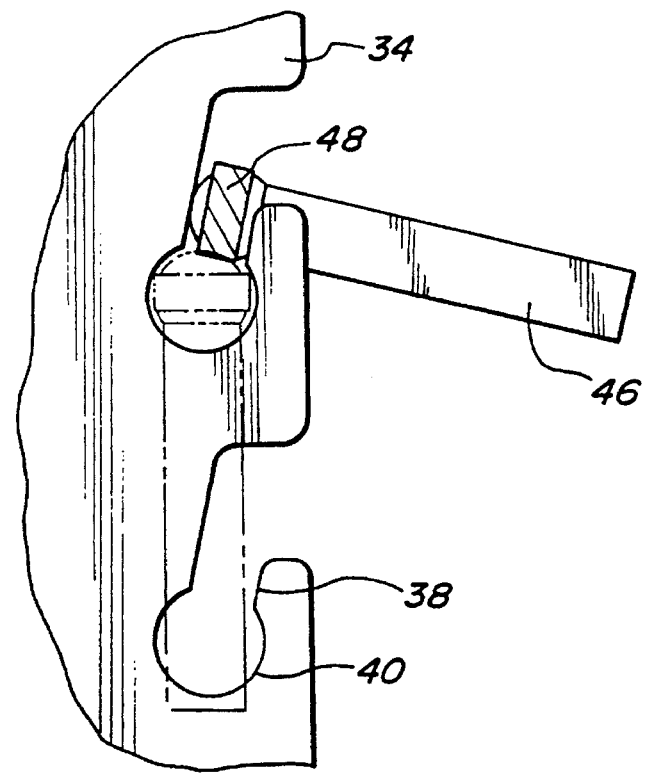
FIG. 4 is an enlarged side view showing the support rod assembled to the pedestal of the cable support system of the present invention.

Each support rod 32 includes a generally cylindrical center section 44 which is bent at a generally right angle on one or both ends to provide a handle 46. A pair of flattened sections 48 are located on center section 44 and are spaced a distance apart which corresponds with the distance between adjacent support plates 30. The assembly of support rods 32 within slots 36, as shown in FIG. 4, requires the rotation of support rod 32 until both flattened sections 48 are aligned with a respective slit 38 in each support plate 30. Flattened sections 48 of rods 32 are then inserted into slit 38 until rod 32 becomes nested within circular aperture 40. Once rod 32 is nested within aperture 40, it is again rotated such that removal of rod 32 from circular aperture 40 is prohibited by the non-alignment of flattened section 48 with slit 38. The angular relationship of flattened section 48 with handle 46 is such that handle 46 will be generally vertically downward when flattened section 48 is in its non-aligned position with slit 38 as shown in phantom in FIG. 4.

By installing a plurality of support rods 32 to a series of pedestals 20, a pattern of support rods 32 can be assembled to support one or more cable trays 42 along a specific route between subfloor 16 and the upper surface of raised floor assembly 10. The height of support rods 32 can be adjusted to facilitate larger or smaller cable trays 42 or to position cable trays 42 at a more convenient level. In addition, if the need arises to have multiple routes for cables between subfloor 16 and the upper surface of raised floor 10, a multiple number of support rods 32 can be located on the respective pair of pedestals 20 to provide support for a multiple number of cable trays 42 as shown in FIGS. 1 and 2.

While FIGS. 1 through 3 have shown multiple cable trays 42 routed parallel with each other, it is within the scope of the present invention to orient the plurality of pedestals 20 or to provide multiple plates 30 on each pedestal 20 to allow for the perpendicular routing of cable trays 42 at different or the same height if desired. Cable trays 42 may be secured to support rods 32 to prevent shifting of cable trays 42 by methods known well in the art if necessary.

FIGS. 5 and 6 show an adjustable cable tray support system 126 according to another embodiment of the present invention. Cable tray support system 126 comprises a support plate 130 secured to each pedestal 20 and a support rod 132 of sufficient length to span the distance between two support plates 30 secured to adjacent pedestals 20. The width of each support plate 130 is such that a side portion 134 of plate 130 extends beyond the structure of pedestal 20 to provide support for rods 132 as will described later herein. Each support plate 130 defines a plurality of rectangular shaped slots 136 which extend through side portion 134 of plate 130. The plurality of slots 136 are spaced along plate 130 to allow multi-positioning for one or more support rods 132.

Each support rod 132 comprises a support bracket 140 and a strut 142. Strut 142 is capable of accepting a pipe hanger 150 or other standard fittings which provides for a more universal system of locating equipment between subfloor 16 and floor panels 24. Bracket 140 is adapted to support strut 142 by interfacing strut 142 with support plate 130. Bracket 140 has a horizontal shelf 144 upon which strut 142 is supported as shown in FIGS. 5 and 6. A vertical wall 146 extends generally perpendicular to shelf 144 and mates with support plate 130. If necessary, strut 142 may be secured to horizontal shelf 144 and/or vertical wall 146 by spot welding or other means known well in the art. A support hook 148 extends generally perpendicular to vertical wall 146 to interface with slots 136 and provide vertical support for support rod 136. Each hook 148 is sized such that it can be inserted through a respective slot 136. Once inserted into the respective slot 136, a notch 150 provided in hook 148 allows for the seating of hook 148 within the respective slot 136 and thus the locking of support rod 132 to support plate 130.

By installing a plurality of support rods 132 to a series of pedestals, similar to support rods 32, a pattern of support rods 132 can be assembled to support one or more cable trays 42 along a specific route between subfloor 16 and the upper surface of raised floor assembly 10. The height of support rods 132 can be adjusted to facilitate larger or smaller cable trays 42 or to position cable trays 42 at a more convenient level. In addition, if the need arises to have multiple routes for cables between subfloor 16 and the upper surface of raised floor 10, a multiple number of support rods 132 can be located on the respective pair of pedestals 20 to provide support for a multiple number of cable trays 42 similar to the embodiment shown in FIGS. 1 through 3. Also, additional routing can be provided by using pipe hangers 150 or other standard fittings.

While FIGS. 5 and 6 have not shown multiple cable trays 42, it is within the scope of the present invention to provide multiple trays, similar to the embodiment shown in FIGS. 1 through 3. These multiple cable trays 42 can be routed parallel with each other or it is within the scope of the present invention to orient the plurality of pedestals 20 or to provide multiple plates 130 on each pedestal 20 to allow for the perpendicular routing of cable trays 42 at different or the same height if desired. If necessary, cable trays 42 may also be secured to support rods 132 to prevent shifting of cable tray 42 by methods known well in the art.

FIGS. 7 and 8 show an adjustable cable tray support system 226 according to another embodiment of the present invention. Cable tray support system 226 comprises a pedestal 220 which has been adapted for supporting a support rod 232. Support rod 232 is of sufficient length to span the distance between adjacent pedestals 220. Pedestal 220 is a rectangular steel post having four sides each of which is provided with the plurality of rectangular shaped slots 136 which extend through each of the four sidewalls. The plurality of slots 136 are spaced along each side of pedestal 220 to allow multi-positioning for one or more support rods 232. In addition, each side of pedestal 220 is provided with two rows of slots 136 in order to enable support rods 232 to be supported on either side or both sides of pedestal 220.

Support rod 232 comprises a support bracket 240 and a strut 242. Strut 242 is also capable of accepting pipe hanger 150 or other standard fittings which provides for a more universal system of locating equipment between subfloor 16 and floor panels 24. Bracket 240 has a horizontal shelf 244 upon which strut 242 is supported as shown in FIG. 7. A vertical wall 246 extends generally perpendicular to shelf 244 and includes support hook 148 which mates with a respective slot 136 similar to that shown in FIGS. 5 and 6.

Similar to the embodiment shown in FIGS. 5 and 6, by installing a plurality of support rods 232 to a series of pedestals 220, a pattern of support rods 232 can be assembled to support one or more cable trays 42 along a specific route between subfloor 16 and the upper surface of raised floor assembly 10. The dual rows of slots 136 on each of the faces of pedestals 220 allow for the positioning of support rods 232 on either or both sides of pedestals 220. The height of support rods 232 can be adjusted to facilitate larger or smaller cable trays 42 or to position cable trays 42 at a more convenient level. In addition, if the need arises to have multiple routes for cables between subfloor 16 and the upper surface of raised floor 10, a multiple number of support rods 232 can be located on the respective pair of pedestals 220 to provide support for a multiple number of cable trays 42. Also, additional routing can be provided by using pipe hangers 150 or other standard fittings.

While FIGS. 7 and 8 have not shown multiple cable trays 42, it is within the scope of the present invention to provide multiple trays, similar to the embodiment shown in FIGS. 1 through 3 and also to utilize adjacent faces of pedestals 220 to allow for the perpendicular routing of cable trays 42 at different or the same height 18 desired.

While the above detailed description describes the preferred embodiment of the present invention, it should be understood that the present invention is susceptible to modification, variation and alteration without deviating from the scope and fair meaning of the subjoined claims.

What is claimed is:

1. A support system for a cable tray, said support system comprising:

a plurality of pedestals disposed between a first surface and a second surface;

at least one elongated plate associated with each of said plurality of pedestals, said elongated plate being disposed between said first and second surfaces and defining a plurality of apertures; and a support rod disposed between each of at least two sets of adjacent pedestals, said support rod being adapted to releasably engage any one of said plurality of apertures defined by each of said plates to provide an adjustable support for said cable tray such that said cable tray can be located at a plurality of locations between said first and second surfaces.

2. The support system according to claim 1 wherein said elongated plate is fixedly secured to each of said pedestals.

3. The support system according to claim 1 wherein said support rod comprises a generally cylindrical rod having a localized flat area.

4. The support system according to claim 1 wherein said support rod comprises:

a strut disposed between said adjacent pedestals; and a bracket disposed at both ends of said strut, each of said brackets adapted to releasably engage any one of said plurality of apertures defined by a respective elongated plate.

5. The support system according to claim 1 wherein said elongated plate is integral with said pedestal.

6. A raised floor assembly comprising:

a plurality of pedestals supportable on a subfloor;

a plurality of floor panels;

means for supporting said floor panels on said pedestals to form a raised floor surface;

at least one elongated plate associated with each of said plurality of pedestals, said elongated plate being disposed between said subfloor and said raised floor surface and defining a plurality of apertures; and a support rod disposed between each of at least two sets of adjacent pedestals, said support rod being adapted to releasably engage any one of said plurality of apertures defined by each of said elongated plates to provide an adjustable support for a cable tray such that said cable tray can be located at a plurality of locations between said subfloor and said raised floor surface.

7. The raised floor assembly according to claim 6 wherein said elongated plate is fixedly secured to each of said pedestals.

8. The raised floor assembly according to claim 6 wherein said support rod comprises a generally cylindrical rod having a localized flat area.

9. The raised floor assembly according to claim 6 wherein said support rod comprises:

a strut disposed between said adjacent pedestals; and a bracket disposed at both ends of said strut, each of said brackets adapted to releasably engage any one of said plurality of apertures defined by a respective elongated plate.

10. The raised floor assembly according to claim 6 wherein said elongated plate is integral with said pedestal.

* * * * *